United States Patent [19]
Wild

[11] Patent Number: 5,584,212
[45] Date of Patent: Dec. 17, 1996

[54] CABLE END FITTING WITH SIMPLIFIED ASSEMBLY

[75] Inventor: Brian J. Wild, Royal Oak, Mich.

[73] Assignee: Hi-Lex Corporation, Battle Creek, Mich.

[21] Appl. No.: 287,495

[22] Filed: Aug. 8, 1994

[51] Int. Cl.⁶ .................................................. F16C 1/22
[52] U.S. Cl. ................................. 74/502.6; 403/319
[58] Field of Search .......................... 74/502.6, 502.4; 403/319, 315, 257, 294; 24/459

[56] References Cited

U.S. PATENT DOCUMENTS

| | | | |
|---|---|---|---|
| 4,177,691 | 12/1979 | Fillmore | 74/502.4 |
| 4,261,221 | 4/1981 | Kobayashi | 74/502.4 |
| 4,294,133 | 10/1981 | Hurley | 74/502.4 |
| 5,161,428 | 11/1992 | Petruccello | 74/502.4 |
| 5,163,338 | 11/1992 | Sharp et al. | 74/502.4 |
| 5,178,034 | 1/1993 | Reasoner | 74/502.6 |
| 5,207,116 | 5/1993 | Sultze | 74/502.6 X |
| 5,295,408 | 3/1994 | Nagle et al. | 74/502.6 |

*Primary Examiner*—Rodney H. Bonck
*Assistant Examiner*—Mary Ann Battista
*Attorney, Agent, or Firm*—Young & Basile, P.C.

[57] ABSTRACT

An end fitting for a cable assembly of the type including a conduit and a core wire slidably mounted within the conduit. The end fitting includes a housing defining a slot for snapping receipt of a mounting pin on a member to be controlled, an elongated tubular guide member receiving the free end of the core wire and slidably mounted on the housing, a spring interposed between the housing and the guide member, and a locking clip mounted on the housing for movement between a disengaged position in which serrations on the clip are spaced from serrations on the guide member and an engaged position in which the clip serrations are engaged with the guide member serrations to preclude axial movement of the guide member relative to the housing. The end fitting is readily assembled by positioning the spring over the guide member and passing the guide member slidably through a housing passage to compress the spring between an outboard face of the housing and a head portion of the guide member and to snappingly position a head portion on the other end of the guide member proximate another outboard face of the housing to preclude axial separation of the guide member from the housing. The locking clip includes outboard finger portions which coact with vertically spaced detents on the outboard faces of side walls of the housing to define the disengaged and engaged position of the locking clip relative to the guide member.

8 Claims, 4 Drawing Sheets

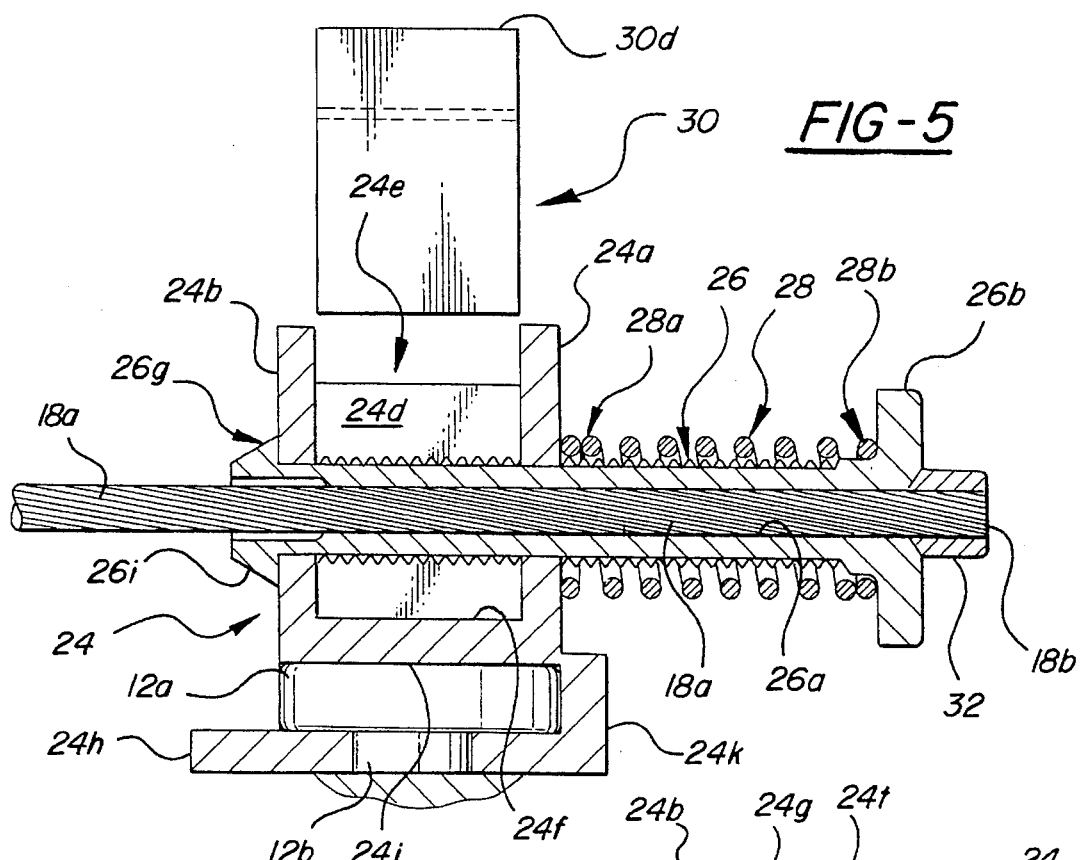
*FIG-5*
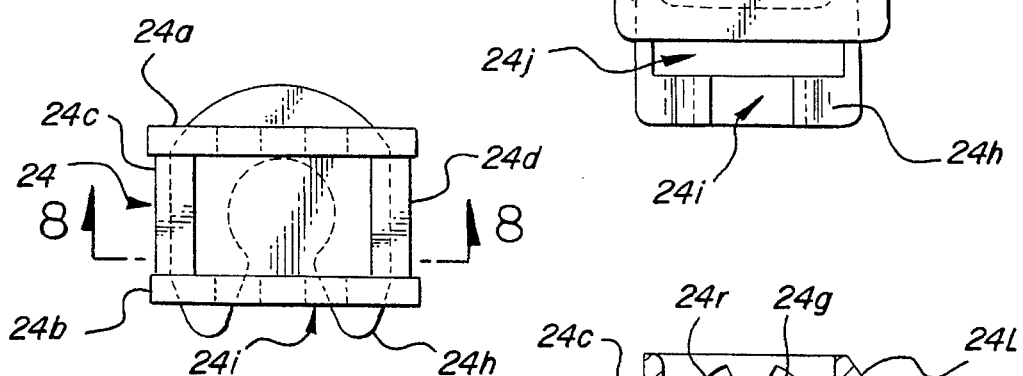
*FIG-6*
*FIG-7*
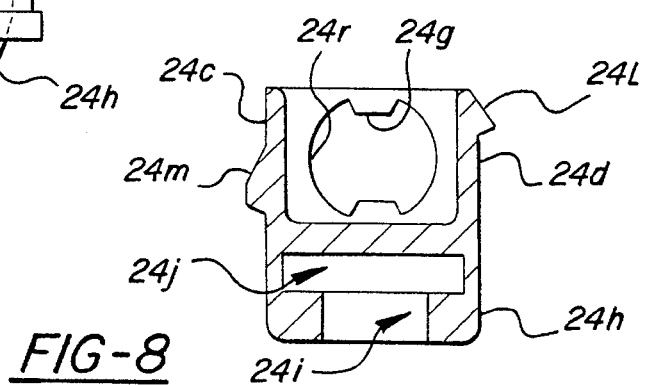
*FIG-8*

CABLE END FITTING WITH SIMPLIFIED ASSEMBLY

FIELD OF THE INVENTION

This invention relates generally to cable end fittings and more particularly to a cable end fitting for adjusting the tension in a cable strand.

Cable end fittings are mounted for example on mounting posts of carburetors or throttle bodies of an automotive engine. The core wire of the cable extends through the end fitting and a retainer member is fixed onto the free end of the core wire to prevent the core wire from separating from the end fitting. In order to provide proper function of the cable assembly in the motor vehicle it is important that some means be provided to adjust the cable length to compensate for the dimensional variations of the system componentry. Various arrangements have been proposed to provide such an adjustment including proposals wherein the conduit housing the core wire is adjusted and arrangements wherein the core wire itself is adjusted. Whereas these conduit and core wire adjustment arrangements are generally satisfactory they do exhibit certain disadvantages. Specifically, the prior art end fittings tend to be complicated and difficult to assemble, thereby increasing the cost of the product; tend to be rather large, thereby complicating their installation in tight confines; and require a complex mounting arrangement with respect to the engine.

SUMMARY OF THE INVENTION

This invention is directed to the provision of an improved end fitting for a cable assembly.

More specifically this invention is directed to the provision of an improved end fitting for a cable assembly which is inexpensive to manufacture and assemble, is compact in size, and is readily mounted relative to the adjacent engine.

The invention end fitting is intended for use with a cable assembly of the type including a conduit and a core wire slidably positioned within the conduit. The end fitting includes a housing defining a slot sized to slidably receive a mounting pin located on a member to be moved, an elongated tubular guide member sized to slidably receive the core wire and slidably mounted in a passage extending through the housing from a front housing face to a rear housing face, and a lock clip mounted on the housing and adapted to lockingly engage the guide member to hold the guide member in a position of sliding adjustment with respect to the housing.

According to the invention, the guide member includes a head member at its forward end and the fitting further includes a coil spring positioned around the guide member and extending between the head member and the front face of the housing. This arrangement provides a simple, inexpensive and reliable construction.

According to a further feature of the invention, the guide member further includes a head portion at the rear end of the guide member and the head portion is arranged to radially contract to allow the guide member to be mounted on the housing by passing the guide member through the passage with the head portion compressing as it passes through the passage and thereafter expanding to coact with the rear face of the housing to preclude axial withdrawal of the guide member from the housing. This arrangement facilitates assembly of the end fitting.

According to a further feature of the invention, the housing slot is provided at the bottom of the housing; the housing includes side walls flanking the passage and the top of the housing is open to allow communication with the passage from the top of the housing; the guide member includes a plurality of axially spaced serrations; and the locking clip includes a central portion defining a plurality of axially spaced serrations for coaction with the serrations on the tubular member and finger portions flanking the central portion and including detent means coacting with vertically spaced first and second detent means on the outboard faces of the housing side walls to respectively define engaged and disengaged positions of the locking clip on the housing. This specific construction facilitates the mounting of the locking clip on the housing and the movement of the locking clip between its engaged and disengaged positions relative to the guide member.

BRIEF DESCRIPTION OF THE DRAWINGS

FIG. 5 is a cross sectional view taken on line 5—5 of FIG. 2;

FIGS. 6, 7 and 8 are rear top, and cross sectional views respectively of a housing employed in the invention end fitting;

DETAILED DESCRIPTION OF THE PREFERRED EMBODIMENT

Figure 1:
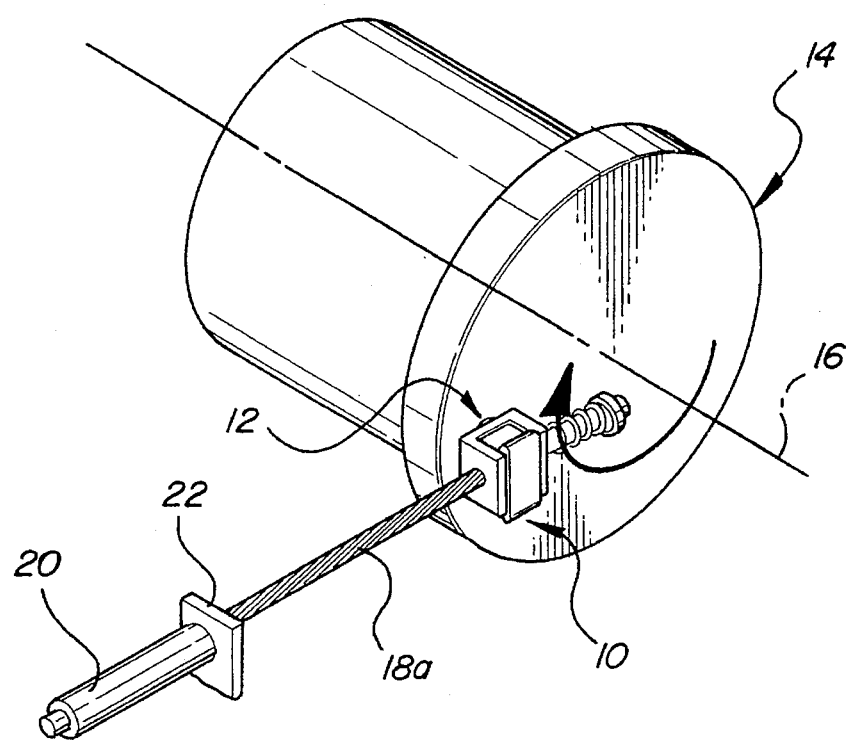
FIG. 1 is a schematic perspective view illustrating a typical automotive application for the invention end fitting.
Figure 2:
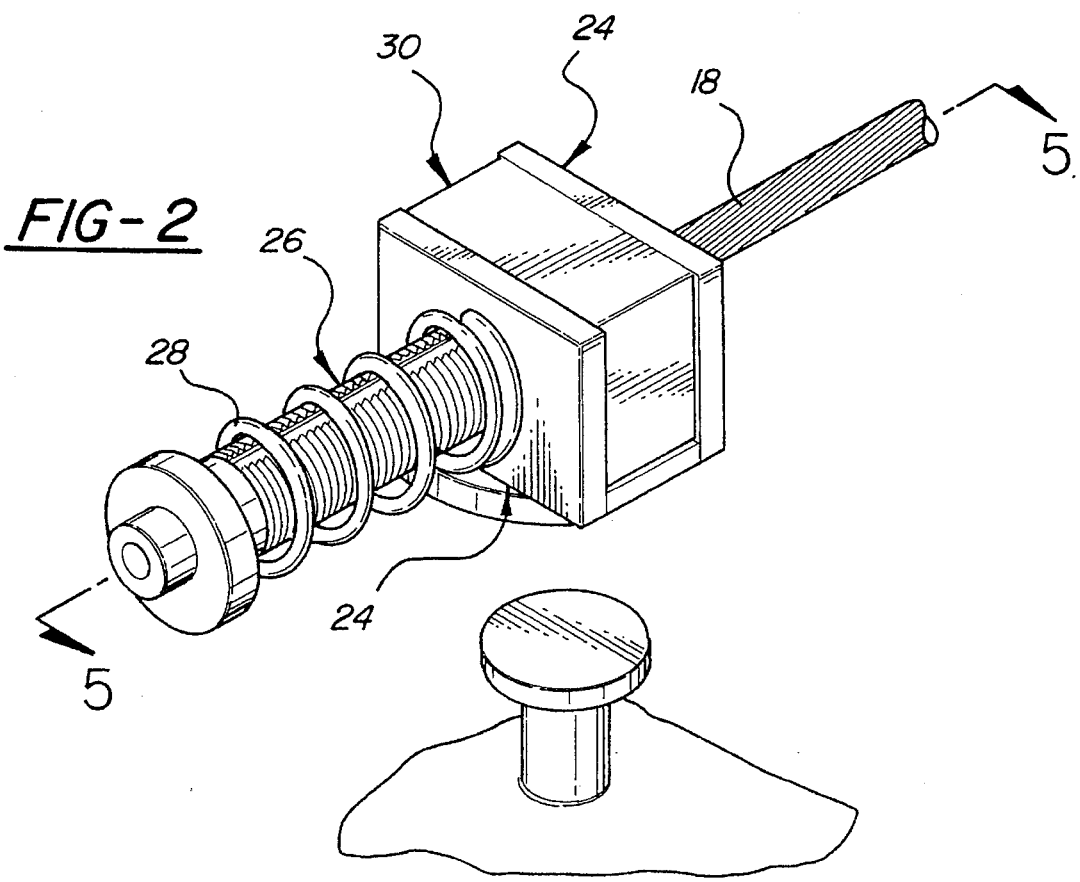
FIG. 2 is a perspective assembled view of the invention end fitting.
Figure 3:
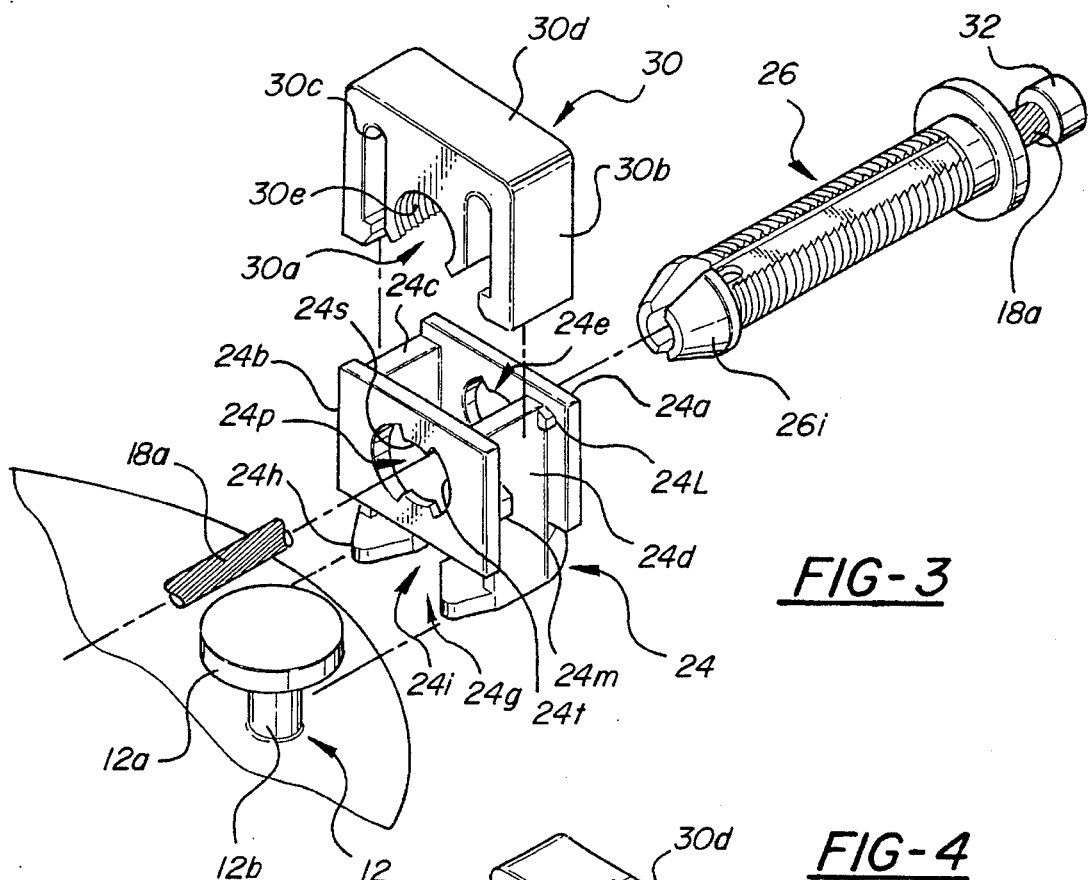
FIGS. 3 and 4 are perspective exploded views of the invention end fitting looking respectively from front and rear ends of the end fitting.

The invention end fitting is seen in FIG. 1 in a typical automotive application in which the end fitting is slidably mounted on a mounting pin 12 which in turn is mounted on, for example, a movable flange 14 of a carburetor or a throttle body of an automotive engine so that movement of the mounting pin 12 by the end fitting 10 moves the flange 14 about axis 16 to control the associated carburetor or throttle body of the associated automotive engine.

The end fitting 10 is adapted to be mounted on the exposed forward end 18a of a core wire 18 of a cable assembly including the core wire and an exterior conduit 20. Conduit 20 may be fixedly secured, for example, to a bracket 22 fixedly secured to the engine assembly with the exposed forward end 18a of the core wire extending forwardly from bracket 22 to mount the end fitting 10. It will be understood that the other, rear end of core wire 18 is attached to an operator pedal or other control mechanism so that movement of the control pedal or control mechanism moves the core wire 18 within the conduit 20 and in turn moves the flange 14 by virtue of the coaction between the mounting pin 12 and the end fitting 10.

End fitting 10 includes a housing 24, a guide member 26, a coil spring 28, and a locking clip 30. Members 24, 26 and 30 are formed of a suitable molded plastic material and spring 28 is formed of a suitable spring steel material.

Housing 24 has a generally boxlike open top configuration including a front wall or flange 24a, a rear wall or flange 24b, side walls 24c and 24d extending between front walls 24a and 24b and coacting therewith to form a boxlike configuration defining a central generally rectangular vertically extending passage 24e opening at the top of the housing, a bottom wall 24f, and a lower slot construction 24g. Slot construction 24g is sized to slidably and lockingly receive the mounting pin 12 and includes left and right finger portions 24h defining a tapered throat 24i opening at the rear face of the housing and providing access to a mounting pin slot 24j defined by the housing beneath bottom wall 24f. The lower portion 24k of the front wall 24a is arcuate and coacts with the lower portions of the side walls 24c and 24d to define a semi-circular configuration at the front of slot 24j for snug receipt of the head portion 12a of the mounting pin following snapping passage of the stem portion 12b of the mounting pin through the throat 24i defined by the fingers 24h.

Vertically spaced detents are provided on the outboard faces of the housing side walls 24c and 24d for coaction with the locking clip 30. Specifically, the outboard face of each housing side wall includes an upper detent 24l positioned proximate and integral with wall 24a and a lower detent 24m positioned proximate and integral with rear wall 24b.

An aperture 24n is provided centrally in front wall 24a and an aperture 24p is provided centrally in rear wall 24b.

Aperture 24n has a circular configuration with the exception that ribs 24q are provided at the 12:00 and 6:00 o'clock positions so as to divide the aperture into two diametrically opposed arcuate sections 24r.

Aperture 24p has a similar circular configuration and includes ribs 24s at the 12:00 o'clock and 6:00 o'clock positions dividing the aperture into two diametrically opposed arcuate portions 24t.

Guide member 26 is elongated, has a tubular configuration, and defines a central through bore 26a sized to slidably receive the forward end 18a of core wire 18. Guide member 26 includes a head member 26b at the forward end of the guide member, a head portion 26c at the rearward end of the guide member, a smooth shank portion 26d proximate head member 26b, a pair of diametrically opposed grooves 26e extending from shank portion 26d to head portion 26c, and a plurality of axially spaced transverse serrations 26f extending between shank portion 26d and head portion 26c and split into left and right serration segments by grooves 26e. The main body portion of the guide member has a diameter approximating the diameter of apertures 24n and 24p and grooves 26e have a configuration corresponding to the configuration of ribs 24q and 24s.

Head portion 26c includes a conical end portion 26g divided by diametrically opposed slots 26h into left and right head portions 26i. The relaxed diameter of conical head portion 26g slightly exceeds the diameter of aperture 24p.

Coil spring 28 is sized to fit snugly but comfortably around the main body portion of guide member 26 and includes a rear end portion 28a for coaction with the front face of housing front wall 24a and a front end portion 28b for coaction with the head member 26b of guide member 26.

Locking clip 30 includes a central portion 30a and flanking finger portions 30b divided from central portion 30a by grooves 30c. Central portion 30a extends downwardly from the top wall 30d of the clip and defines a plurality of axially spaced semi-circular transverse serrations 30e having an axial spacing and a cross sectional configuration corresponding to the axial spacing and cross sectional configuration of the serrations 26f on the guide member. Grooves 30c and serrations 30e coact to define a pair of spaced inner finger portions 30f. Flanking finger portions 30b are spaced laterally apart by a distance corresponding generally to the lateral spacing of the outboard faces of housing side walls 24c and 24d and each flanking finger portion includes a detent portion 30g at the lower end of the flanking finger portion for detenting coaction with the detents 24l and 24m on the side walls of the housing.

To assemble the invention end fitting onto a cable assembly, the exposed front end 18a of the core wire is passed through the central bore 26a of the guide member; a retainer member 32 is fixed onto the distal end 18b of the core wire; coil spring 28 is fitted over guide member 26 with the front end 28b of the spring positioned against the head 26b of the guide member; and the guide member is slid axially through the passage means defined by apertures 24n and 24p with the slots 26e coacting with ribs 24q and 24s to guide the sliding movement of the guide member relative to the housing and to provide a smooth contacting surface as between the housing and the guide member so as to facilitate consistent adjustments. As the head portion 26g of the guide member reaches the inboard face of aperture 24p, the slots 26h allow the conical portions 26i of the head portion 20 to collapse radially so as to allow the head portion to pass through the aperture whereafter, as soon as the head portion has cleared the aperture, the head portion sections 26i expand to preclude axial separation of the guide member from the housing in response to forward movement of the guide member relative to the housing. Clip 30 is now moved downwardly relative to the housing member to position finger portions 30b in respective outboard relation to the outboard faces of housing side walls 24c and 24d and engage finger detent portions 30g with the underface of housing detents 24l with clip central portion 30a positioned between the inboard faces of side walls 24c and 24d but with serrations 30e disengaged from the serrations 26f on the guide member so as to allow free axial movement of the guide member relative to the housing under the resistance of spring 28.

In this preassembled shipping condition, the cable assembly is delivered to the installation site where the opposite ends of the conduit are fixedly secured at appropriate fixed points in the vehicle; the rear end of the core wire is attached to the respective pedal or control member; housing 24 is moved relative to the mounting pin 12 on the flange 14 to snappingly position the head 12a of the pin in slot 24i; guide member 26 is moved slidably relative to housing 24 until the proper position is achieved by virtue of the interconnection of the distal end of the core wire with the guide member head 26b via retainer member 32; and locking clip 30 is pushed downwardly to engage the locking clip finger detent portions 30g with the lower faces of the lower detents 24m on the outboard face of the side walls of the housing and simultaneously engage the serrations 30e defined on the central portion 30a of the clip with a corresponding plurality of serrations 26f on the guide member and thereby lock the guide member with respect to the housing and preclude axial movement of the guide member relative to the housing so as to maintain the desired tension in the core wire 18.

As the locking clip moves downwardly from its preassembled shipping position to its locking position, the inner finger portions 30f flex outwardly to receive the guide member and thereafter flex inwardly to firmly embrace the guide member. The outward and inward flexing of inner finger portions 30f as the locking clip assumes its locking position ensures that the locking clip cannot be installed part way and also ensures that the central portion of the locking clip will remain in place around the guide member even if the outer flanking finger portions 30b should fail for any reason.

Figure 4:
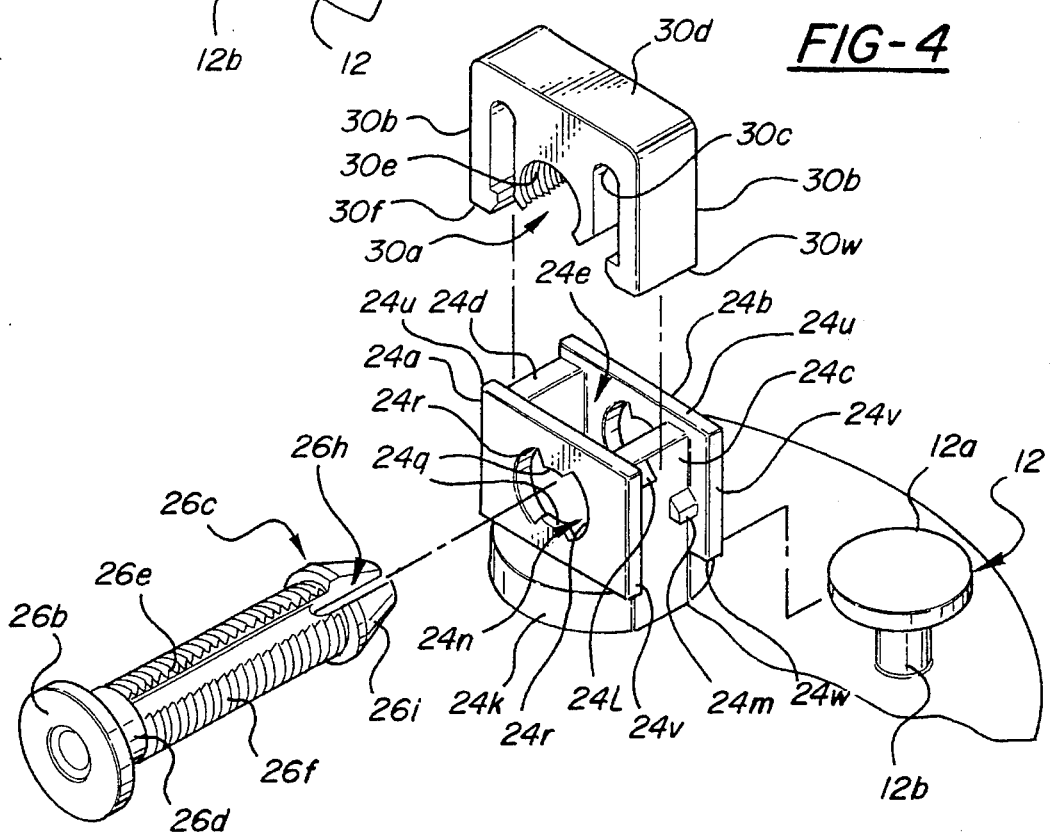
Figure 9:
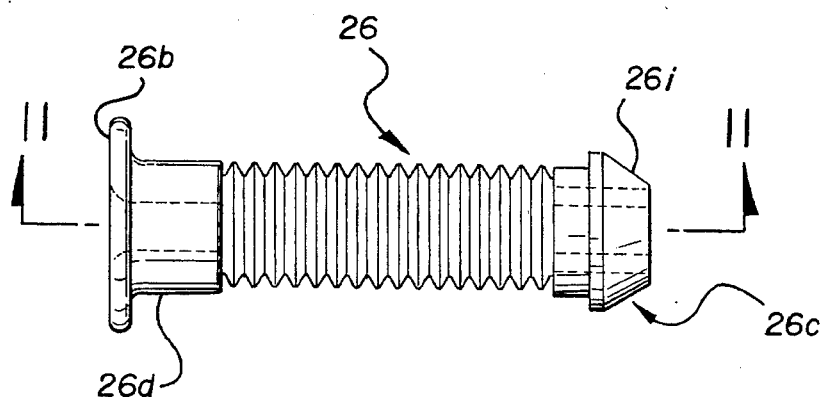
FIGS. 9, 10 and 11 are side, end and cross sectional views respectively of a guide member employed in the invention end fitting.
Figure 10:
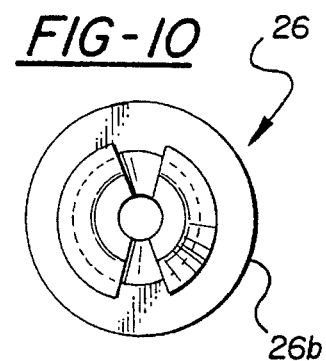
Figure 11:
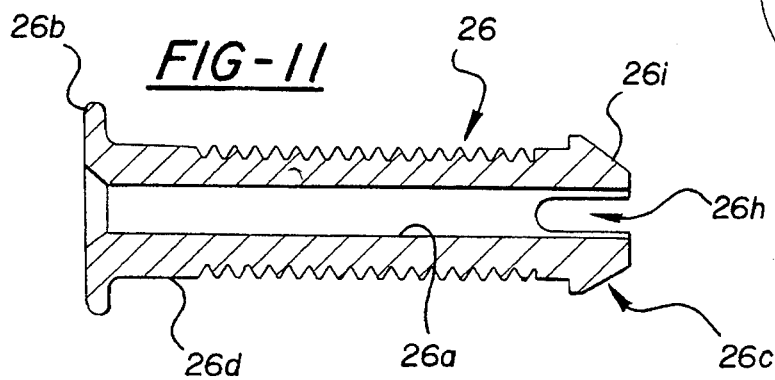
Figure 13:
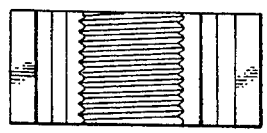
FIGS. 12 and 13 are end and top views respectively of a locking clip employed in the invention end fitting.
Figure 12:
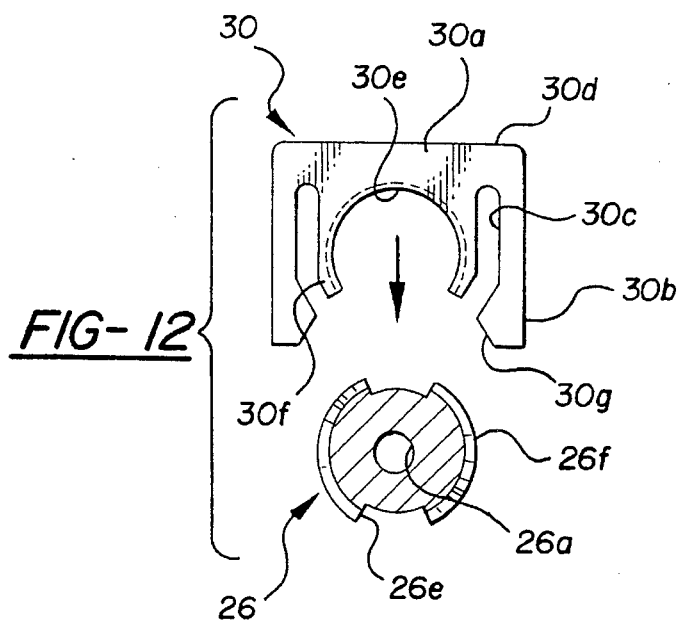

In the locked configuration of the locking clip relative to the housing, the clip and housing coact to define a smooth cubicle package. Specifically, and as indicated by the dash lines of FIG. 4, the top face 30d of the clip is flush with the top edges 24u of the housing front and rear walls; the outboard faces of the finger portions 30b are flush with the side edges 24 of the housing front and rear walls; and the lower edges 30w of the clip finger portions 30b are aligned with the lower edges 26w of the housing front and rear walls.

The invention end fitting will be seen to be comprised of relatively few parts with each part having a relatively simple configuration to minimize manufacturing costs; will be seen to allow ready assembly of the housing, spring and guide member by a simple sliding movement of the guide member relative to the housing; will be seen to provide a compact overall package to allow the use of the end fitting in confined spaces; and will be seen to allow for the ready and positive positioning of the locking clip in both the disengaged and engaged positions of the clip.

Whereas a preferred embodiment of the invention has been illustrated and described in detail it will be apparent that various changes may be made in the disclosed embodiment without departing from the scope or spirit of the invention.

I claim:

1. An end fitting for a cable assembly including a conduit and a core wire slidably positioned within the conduit, said fitting including:

a housing having an open top box-like configuration including a front wall having an aperture, a rear wall having an aperture axially aligned with the aperture in the front wall, and side walls;

an elongated tubular guide member slidably received in said apertures, including front and rear ends and a plurality of axially spaced serrations, and having a central through axial bore sized to receive the core wire; and a locking clip including at least one serration for locking coaction with the serrations on the tubular guide member and mounted on the housing for movement between an engaged position in which said at least one serration is engaged with said serrations on said tubular guide member to preclude axial movement of said tubular guide member relative to said housing and a disengaged position in which said at least one serration is disengaged from said serrations on said tubular guide member to allow axial movement of said tubular guide member relative to said housing;

the guide member further including a head portion at the rear end of the guide member and the head portion being arranged to radially contract to allow the guide member to be mounted on the housing by passing the guide member rearwardly through the aperture in the rear wall with the head portion compressing as it passes through the aperture and thereafter expanding to coact with a rear face of the housing to preclude axial withdrawal of the guide member from the housing.

2. An end fitting for a cable assembly including a conduit and a core wire slidably positioned within the conduit, the fitting including a housing, an elongated tubular guide member sized to slidably receive the core wire and slidably mounted in a passage extending through the housing from a front housing face to a rear housing face, and a locking clip mounted on the housing and adapted to lockingly engage the guide member to hold the guide member in a selected position of sliding adjustment with respect to the housing, characterized in that:

the guide member includes a head member at a forward end of the guide member and the fitting further includes a coil spring positioned around the guide member and extending between the head member and the front housing face; and the guide member further includes a head portion at a rear end of the guide member and the head portion is arranged to radially contract to allow the guide member to be mounted on the housing by passing the guide member rearwardly through the passage with the spring compressing against the front housing face and the head portion compressing as it passes through the passage and thereafter expanding to coact with the rear face of the housing to preclude axial withdrawal of the guide member from the housing while the spring resists rearward movement of the guide member relative to the housing.

3. An end fitting for a cable assembly including a conduit and a core wire slidably positioned within the conduit, said fitting including:

a housing having an open top box-like configuration including a front wall having an aperture, a rear wall having an aperture axially aligned with the aperture in the front wall a bottom wall, and side walls;

an elongated tubular guide member slidably received in said apertures, including front and rear ends and a plurality of axially spaced serrations, and having a central through axial bore sized to receive the core wire;

a locking clip including at least one serration for locking coaction with the serrations on the tubular guide member and mounted on the housing for movement between an engaged position in which said at least one serration is engaged with said serrations on said tubular guide member to preclude axial movement of said tubular guide member relative to said housing and a disengaged position in which said at least one serration is disengaged from said serrations on said tubular guide member to allow axial movement of said tubular guide member relative to said housing; and coacting means on the rear end of said tubular guide member and on said rear wall operative to preclude axial separation of the tubular guide member from said housing in response to rearward movement of said tubular guide member relative to said housing;

said tubular guide member including a head member at the front end thereof;

said end fitting further including a coil spring positioned around said tubular guide member and extending between a forward face of the front wall of said housing and the head member of the tubular guide member;

said coacting means comprising a head portion on the rear end of said tubular guide member adapted to engage a rear face of the rear wall of said housing to preclude axial separation of said guide member from said housing;

the head portion of said tubular guide member including slots which allow the head portion to be resiliently radially compressed to an extent to allow movement of the head portion through the aperture in the rear wall of said housing, whereby said tubular guide member may be mounted on said housing by passing said tubular guide member through said apertures with the head portion compressing as it passes through the aperture in the rear wall of said housing and thereafter expanding to preclude axial withdrawal of said tubular guide member from said housing.

4. An end fitting for a cable assembly including a conduit and a core wire slidably positioned within the conduit, the fitting including a housing defining a slot provided at the bottom of the housing and sized to slidably receive a mounting pin located on a member to be moved, an elongated tubular guide member sized to slidably receive the core wire and slidably mounted in a passage extending through the housing from a front housing face to a rear housing face, and a locking clip mounted on the housing and adapted to lockingly engage the guide member to hold the guide member in a selected position of sliding adjustment with respect to the housing, characterized in that:

the guide member includes a head member at a forward end of the guide member and the fitting further includes a coil spring positioned around the guide member and extending between the head member and the front housing face;

the guide member further includes a head portion at a rear end of the guide member and the head portion is arranged to radially contract to allow the guide member to be mounted on the housing by passing the guide member through the passage with the head portion compressing as it passes through the passage and thereafter expanding to coact with the rear face of the housing to preclude axial withdrawal of the guide member from the housing;

the housing includes side walls flanking the passage and a top wall of the housing is open to allow communication with the passage from the top of the housing;

the guide member includes a plurality of axially spaced serrations; and the locking clip includes a central portion defining a plurality of axially spaced serrations for coaction with the serrations on the guide member and finger portions flanking the central portion and including detent means coacting with vertically spaced first and second detent means on outboard faces of said housing side walls to respectively define engaged and disengaged positions of the locking clip on the housing.

5. An end fitting for a cable assembly including a conduit and a core wire slidably positioned within the conduit, said fitting including:

a housing having an open top box-like configuration including a front wall having an aperture, a rear wall having an aperture axially aligned with the aperture in the front wall, a bottom wall, and side walls;

an elongated tubular guide member slidably received in said apertures, including front and rear ends and a plurality of axially spaced serrations, and having a central through axial bore sized to receive the core wire;

a locking clip including at least one serration for locking coaction with the serrations on the tubular guide member and mounted on the housing for movement between an engaged position in which said at least one serration is engaged with said serrations on said tubular guide member to preclude axial movement of said tubular guide member relative to said housing and a disengaged position in which said at least one serration is disengaged from said serrations on said tubular guide member to allow axial movement of said tubular guide member relative to said housing; and coacting means on the rear end of said tubular guide member and on said rear wall operative to preclude axial separation of said tubular guide member from said housing in response to rearward movement of said tubular guide member relative to said housing;

said locking clip including a central portion defining a plurality of axially spaced serrations, including said at least one serration, for coaction with the serrations on the tubular member and finger portions flanking the central portion and including detent means coacting with vertically spaced first and second detent means on outboard faces of the side walls of said housing to respectively define the engaged and disengaged positions of the locking clip on the housing.

6. A fitting according to claim 5 wherein:

said finger portions are separated from said central portion by grooves; and said grooves slidably receive upper portions of said housing side walls as the locking clip is moved to the engaged position.

7. An end fitting for a cable assembly including a conduit and a core wire slidably positioned within the conduit, said fitting including:

a housing having an open top box-like configuration including a front wall having an aperture, a rear wall having an aperture axially aligned with the aperture in the front wall, and side walls;

an elongated tubular guide member slidably received in said apertures, including front and rear ends and a plurality of axially spaced serrations, and having a central through axial bore sized to receive the core wire;

a locking clip including at least one serration for locking coaction with the serrations on the tubular guide member and mounted on the housing for movement between an engaged position in which said at least one serration is engaged with said serrations on said tubular guide member to preclude axial movement of said tubular guide member relative to said housing and a disengaged position in which said at least one serration is disengaged from said serrations on said tubular guide member to allow axial movement of said tubular guide member relative to said housing; and coacting means on the rear end of said tubular guide member and on said rear wall operative in response to axial sliding rearward movement of said tubular guide member in said apertures to preclude axial withdrawal of said tubular guide member from said housing;

said tubular guide member including a head member at the front end thereof;

said end fitting further including a coil spring positioned around said tubular guide member and extending between a forward face of the front wall of said housing and the head member of the tubular guide member.

8. An end fitting according to claim 7 wherein:

said coacting means comprises a head portion on the rear end of said tubular guide member adapted to engage a rear face of the rear wall of said housing to preclude axial withdrawal of said tubular guide member from said housing.

* * * * *